United States Patent

[11] 3,615,781

[72] Inventors: Robert H. Schneider, 3639 Grennoch, Houston, Tex.;
John B. Schutt, 2403 Peach Stone Court, Silver Spring, Md.
[21] Appl. No.: 750,457
[22] Filed: Aug. 6, 1968
[45] Patented: Oct. 26, 1971

[54] TWO-POT SILICATE COATINGS COMPOSITIONS
21 Claims, No Drawings

[52] U.S. Cl. ................................................. 106/84
[51] Int. Cl. ................................................. C09d 1/04
[50] Field of Search ..................................... 106/74, 84

[56] References Cited
UNITED STATES PATENTS

| | | | |
|---|---|---|---|
| 2,807,552 | 9/1957 | Robinson et al. | 106/74 |
| 2,905,562 | 9/1959 | Brown | 106/74 |
| 3,130,061 | 4/1964 | McMahon et al. | 106/84 M |

Primary Examiner—James E. Poer
Attorneys—Arnold, Roylance, Kruger & Durkee, Tom Arnold, Donald C. Roylance, Walter Kruger, Bill Durkee, Frank S. Vaden, III and John F. Lynch ABSTRACT: High sheen, silicate coatings compositions which demonstrate water-resistance, fire-resistance, abrasion-resistance, and soil-resistance are prepared as a two-container system. An alkali metal silicate solution and a colloidal silica sol are admixed to provide a mixture having an $SiO_2:M_2O$ mole ratio of about 10:1 and which contains more than about 35 percent by weight of silicate and silica at a pH sufficiently high to promote hydration of the silica. The coatings do not possess long shelf life and are applied soon after admixture of the ingredients. Various bulking agents and the like can be added to these coatings. For example, the addition of finely divided mica provides an excellent coating for fireproofing polyurethane foam.

TWO-POT SILICATE COATINGS COMPOSITIONS

BACKGROUND

The instant invention relates to a silicate coating composition. In particular this invention provides a novel two-container silicate coating wherein the components are admixed shortly before use. The coatings of this invention result in glossy finishes which are soil resistant, fire resistant, water resistant, and corrosion resistant.

Silicate coating compositions have been known to provide excellent abrasion resistance and even fire resistance in the prior art. However, these coatings have characteristically been subject to rapid attack by alkaline mediums and even subject to slow attack by water itself.

The compositions of the instant invention provide a basic vehicle which may be used in a variety of coatings for a variety of applications. The coatings of the instant invention may be permitted to air dry or may be baked dry. These coatings provide a smooth glossy surface on a substrate, and may be applied as a single application coating without an undercoat of primer.

The coatings of the instant invention differ from the coatings of copending application Ser. No. 750,461, mentioned above, in that the coatings of this invention are admixed shortly prior to use because the coatings herein are formulated so that the silicate content is sufficiently high to make the composition after admixture inherently unstable. Moreover, the coatings of the instant invention provide smooth glossy films whereas the coatings of copending application Ser. No. 750,461 characteristically result in flat finishes, or at best, when the coatings are bake dried, they may provide a satin gloss finish.

In one particular embodiment, the coatings of the instant invention provide an excellent fireproofing coating for polyurethane foam or the like. The coatings of the instant invention can be formulated to have good bridging characteristics enabling them to be spread over porous surfaces without cracking. Moreover, the coatings of the instant invention are extremely resistant to heat and will not burn, and consequently can be used to coat polyurethane foam thus making this foam usable in construction applications where heretofore it could not be used because of the fire hazard which it represented.

Other bulking agents may also be employed in the coatings of the instant invention. For example, zinc dust may be added to the coatings of the instant invention to provide a galvanizing coating. Other powdered metals may also be employed as bulking agents to contribute corrosion resistance, wear resistance, a lubricated surface, or the like. The coatings may be modified with opacifiers and/or pigments as will be come apparent hereinafter.

SUMMARY OF THE INVENTION

It is accordingly an object of this invention to provide a coatings composition having a high silicate content which composition is capable of forming water-resistant, fire-resistant, soil resistant, and abrasion-resistant surfaces.

Another object of this invention is to provide a novel two-container silicate composition.

It is a further object of this invention to provide a novel silicate coatings composition capable of forming films with a smooth or glossy surface.

It is a still further object of this invention to provide a silicate coatings composition which is fire-resistant and which may be employed to fireproof polyurethane foam.

It is a further object of this invention to provide a basic silicate coatings vehicle which can be suitably modified with a variety of bulking agents to enable production of various silicate coatings having sheen, soil-resistance, water-resistance, and other beneficial properties.

Other additional objects of this invention will be apparent upon consideration of the ensuing specification and claims.

The compositions of the instant invention comprise a coating vehicle which is solution dispersions containing an alkali metal silicate and colloidal silica and having a solids content of at least about 35 percent by weight and a silicon dioxide-alkali metal oxide mole ratio of at least 8–1. By the term "solids content" as used herein, reference is to the content of alkali metal silicate and dissolved silica based upon the total weight of the medium in which they are maintained and not to any other constituents which might be added to the coating formulation.

The solution-dispersion vehicle of this invention is prepared by admixing a solution phase which comprises the alkali metal silicate solution with a dispersion phase which comprises a colloidal silica suspension. When combined the solids content is at least about 35 percent and the pH of the resulting solution dispersion is initially sufficiently high to promote hydration in the mixture as a result of which the silica in the composition becomes coordinated with water thus forming solids which ultimately form the coating film when the coating is employed.

Typically the initial pH of the solution-dispersion vehicle of this invention is about 11 or 12 or higher, though pH may drop after the system has stood for a time and begins to crosslink.

Furthermore, the coatings vehicles of this invention are preferably modified by the addition of small amounts of a hydrocarbyl silane wetting agent and by addition of multivalent ions such as calcium ions to the coating, the latter to effect a coordination of the silica on a substrate once the mixture is applied as a coating.

DESCRIPTION OF THE SPECIFIC EMBODIMENTS

The compositions of this invention are prepared by mixing an alkali metal solution phase and a colloidal silica dispersion phase to obtain the solution-dispersion vehicle.

The alkaline metal solution phase employed in the coating compositions of the instant invention comprises an aqueous solution of an alkali metal silicate for mixtures of an alkali metal silicate. Such alkali metal silicates solutions are available commercially and are commonly identified by the molar ratios of $SiO_2$ to alkali metal oxide. These ratios usually range from about 1:1 to as high as about 3.9:1 in commercially available solutions. Any of these commercially available alkali metal silicates may be employed, although it will become apparent herein that alkali metal silicate solutions having a high molar ratio of $SiO_2$ to alkali metal oxide will be preferred. Thus it is preferred in accordance with the instant invention to employ an alkali metal silicate solution phase having an $SiO_2$ to alkali metal oxide mole ratio of about 3:1 to about 4:1. In those instances wherein the available alkali metal silicate solution has a ratio lower than this, it is preferred to raise the mole ratio of $SiO_2$ to alkali metal oxide according to the methods prescribed herein.

The suitable water-soluble alkali metal silicate solutions which may be employed in this invention include solutions of lithium silicate, potassium silicate, and sodium silicate.

In identification of the alkali metal silicate solutions of the instant invention, the alkali metal oxides are generally expressed by the designation $M_2O$. Thus lithium oxide is $Li_2O$, potassium oxide is $K_2O$, and sodium oxide is $Na_2O$. Herein reference to the molar ratio between $SiO_2$ and the alkali metal oxide will be referred to as the $SiO_2:M_2O$ molar ratio.

In accordance with this invention, the alkali metal silicate solution may be upgraded in its solvated or hydrated silica content to achieve an $SiO_2:M_2O$ ratio in the neighborhood of 3:1 to 4:1 by the addition of metasilicic acid (also referred to as monosilicic acid) to the alkali metal silicate solution. Metasilicic acid is ideally represented by the formula $SiO_2 \cdot H_2O$. However, it is satisfactory to use metasilicic acid in the form where about 85 percent by weight is $SiO_2$. These forms of metasilicic acid are well known to the art.

The metasilicic acid is generally added to increase the $SiO_2:M_2O$ ratio of the alkali metal silicate solution to about 3:1 to 4:1. However, it is possible to increase the molar ratio even more by addition of metasilicic acid, and in some of the compositions of this invention, it may be preferred to use alkali metal silicate solutions wherein the $SiO_2:M_2O$ ratio is as high as 5 to 1 or more. It should be noted that there is an upper limit to the mole ratio which may be achieved in alkali metal silicate solutions by addition of metasilicic acid. When dealing with sodium silicate or potassium silicate solutions, this ratio may be increased to about as high as 5.4 to 1 or 5.5 to 1. In the case of lithium silicate solutions, a considerably higher ratio of $SiO_2:Li_2$ up to 6.4 to 1 can be achieved.

However, at these very high $SiO_2:M_2O$ ratios, the compositions of the instant invention become difficult to handle and can result in brittle coatings. As will be seen below only in those cases wherein the coating is provided with sufficient multivalent metal ion to cross-link the silica network can such high mole ratio alkali metal silicate solutions be practically employed.

It also should be noted that when the $SiO_2:M_2O$ ratio the alkali metal silicate solution is increased, it is usually necessary to decrease the concentration of silica and alkali metal oxide in the aqueous medium in which the materials are maintained. For example, a potassium silicate solution is commercially available in a concentration of 35 percent by weight potassium silicate having an $SiO_2:K_2O$ molar ration of 3.3 to 1. However, if this solution were to be upgraded to provide a molar ratio of 4:1 between a silica dioxide and the potassium oxide, additional water would preferably be added to the solution to reduce the weight concentration in the aqueous medium to about 25 or 30 percent by weight.

Accordingly, it will be appreciated that herein it is desired to produce an ultimate vehicle having a solids content of greater than 35 percent by weight after admixture of the alkali metal silicate solution phase and the colloidal silica dispersion phase. If the $SiO_2:M_2O$ mole ratio of the alkali metal silicate solution phase is increased to a high degree, it will be necessary to correspondingly decrease the solids content of this phase to maintain stability. Consequently, it becomes difficult to achieve a proper balance between the two phases when mixture is undertaken to achieve the desired solids content in the ultimate coating vehicle.

The colloidal silica dispersion phase employed in the compositions of the instant invention is preferably a colloidal silica sol. These dispersions of colloidal silica in water are commonly available in concentrations of about 50 percent by weight colloidal silica. Small amounts of alkali metal hydroxide such as sodium hydroxide is commonly employed in the dispersion to maintain stability thus providing a pH of the colloidal silica sol in the neighborhood of about 8.5 to 9.5.

In preparing the basic vehicle for the coatings compositions of the instant invention, the alkali metal silicate solution and the colloidal silica sol are admixed with other constituents, as will be apparent hereinbefore to provide a solution-dispersion having a solids content of at least 35 percent by weight, an $SiO_2:M_2$ mole ratio of at least 8:1 and preferably about 10:1 resulting in an initial pH of 11 or 12 and a final pH of about 11 or less.

The $SiO_2:M_2O$ mole ratio is increased from the 3:1 to 4:1 range available in the alkali metal silicate solution to the desired range of at least 8:1 and preferably 9:1 or 10:1 mainly with colloidal silica. Use of such a plain colloidal silica sol is less expensive and more easily accomplished than is upgrading with metasilicic acid.

At the solids content, pH and mole ratios prescribed herein, the solution-dispersion is unstable in that the silica network will tend to coordinate and thicken the mixture to an extent that it will not be usable as a coating. Consequently, as will be further explained herein, the solution-dispersion vehicles of the instant invention are formulated shortly before use and are preferably employed within a short period after formulation, e.g., about 24 hours.

Other types of silica may be employed together with the colloidal silica sol in the aqueous dispersion phase used in formulating the vehicles of this invention. For example, small amounts of a colloidal silica sol wherein the silica has a surface coating of aluminum oxide may be employed. The amount of aluminum oxide on the silica is extremely small ranging from about 0.0025 to 0.010 moles of aluminum oxide per mole of $SiO_2$. Such aluminum oxide silica is advantageously used in small amounts in the compositions of the instant invention. Such aluminum oxide silica is preferably employed in amounts ranging to about 10 percent by weight of the silica employed in the dispersion phase.

The use of a small amount of aluminum oxide modified silica in the compositions of the instant invention has been found to be advantageous in that it appears to improve hardness and inhibit cracking of the ultimate coating. However, the aluminum oxide-modified silica has a thickening action and accordingly if large amounts of the material are used, it is necessary to correspondingly add large amounts of water. This addition of water has the effect of making it difficult to achieve a 35 or higher percent solids content in the solution-dispersion vehicle upon mixture of the solution and dispersion phase.

Further it should be noted that a hydrocarbon modified silica or a "hydrophobic" silica may be employed in small amounts in the dispersion phase. This hydrophobic silica is typically identified by the presence of oxyalkyl groups, typically oxymethyl groups pendent from the coordinated silica in the dispersion. A suitable hydrophobic silica is available from Degussa, Inc. under the designation R-972.

The use of hydrophobic silica tends to preserve the "wet edge" of the coatings of this invention. The aluminum oxide modified silica serves the same purpose. In this regard, these additives appear to prevent rapid water loss from the coatings once they are applied. If water loss from the coatings is too rapid, the coatings tend to crack. However, while water is present in the coatings, it appears that the ions within the coatings can diffuse and find an equilibrium position thus enabling formation of a strong integral silicon network in the coating when dry.

Preferably, the vehicles of the instant invention when formulated have a solids content of 40 percent or more. In accordance with the instant invention, the solution-dispersion vehicles have a solids content of at least 35 percent by weight at a pH in the range of about 11 or more. In contrast to the compositions of copending application Ser. No. 750,461, it is desired in the compositions of the instant invention to formulate a vehicle by admixture of the alkali metal silicate solution and the colloidal silica dispersion which vehicle has this high solids content. Consequently, an ultimate coating having a high gloss soil-resistance and fire-resistance is achieved. Furthermore, the coatings of this invention form a very tight film and do not tend to be at all porous.

The vehicles of the compositions of the instant invention comprise basically the admixture of the alkali metal silicate solution and the colloidal dispersion. However, the vehicles herein also may be modified by addition of silane wetting agents and multivalent ions to coordinate the silica network. The remaining constituents of the compositions of the instant invention constitute bulking agents or additives depending upon the particular coating use rather than constituents of the basic vehicle on which the coatings are based.

It has been found that of the wetting agents which may be employed, the silane wetting agents are singularly useful as additions to the vehicles of this invention. These wetting agents provide the desired wetting characteristics for the bulking agents yet do not destroy the water insolubility of the ultimate compositions after they are cured, since the silane wetting agents enter into the silica coordination in the ultimate coating. The silane wetting agents are useful in that they function to wet in whatever bulking agents are employed in the composition of this invention as will be discussed below.

The silane wetting agents employed in the vehicles of this invention preferably include the difunctional and trifunctional silanes such as the hydrocarbon or oxyhydrocarbon alkoxy silanes or the quadrifunctional silanes such as hydrocarbon or oxyhydrocarbon alkoxy silanes wherein the hydrocarbon moiety contains an oxirane oxygen function.

Typically preferred among the difunctional and the trifunctional silane wetting agents are the alkyl alkoxy silanes including dimethyl dimethoxy silane, methyl trimethoxy silane, ethyl trimethoxy silane, isopropyl trimethoxy silane, methyl triethoxy silane and the like; the aryl alkoxy silanes, including phenyl trimethoxy silane or the alkyl trimethoxy silanes; the oxyhydrocarbyl silanes such as methoxy ethyl trimethoxy silane and the like. The quadrifunctional silanes include those which also are identified by an oxirane oxygen moiety on the hydrocarbyl group, e.g., gamma-glycidyloxy propyl trimethoxy silane.

The trifunctional silanes have the function of wetting in the additives with bulking agents added to the coating composition. The quadrifunctional silane wetting agents are not so efficient as wetting agents because of the longer hydrocarbon chain pendent thereon. However, the additional reactive site provided by the oxirane oxygen appears to result in an increased amount of cross-linking which improves the hardness of the ultimate coating. Mixtures of trifunctional and quadrifunctional silane wetting agents can consequently be used. It will be apparent to those skilled in the art that the smaller are the alkyl substituents on the silane wetting agents of this invention, the more water soluble will be the wetting agent. Accordingly, such short chain hydrocarbon silanes are preferred particularly in those instances where the bulking agents are difficult to wet into the composition. Thus, if an organic polymer bulking agent such as polytetrafluoroethylene is used, a short chain silane wetting agent would be preferred. If talc or the like is added as the bulking agent to the coating, longer chain alkyl silanes may be used.

The silanes improve the adhesion of the the instant coatings and impart a smoothness to the coatings, make the coatings easier to apply, and appear to preserve the workability or wet edge of the coatings during the application procedure. The silane wetting agents are added in small amounts sufficient to wet in the solid material to be added to the coating and to provide the desired wet edge and are preferably added prior to the addition of the solid material. Typically the amount of silane will vary from about 2 to about 15 percent by weight of the unbulked vehicle. The silane is added with agitation which is preferably continued for a short time, e.g., about 3 to 10 minutes after addition. It is postulated the silane hydrolyzes and will reach an equilibrium during this time. The unbulked vehicle refers to the coating prior to addition of pigments or opacifiers, bulking agents and like.

A further modification which may be introduced into the coatings of this invention to promote film integrity and water-resistance is the addition of a multivalent metal ion to the vehicle. The multivalent metal ion appears to cross-link the coating and preserve coating integrity.

Typically, multivalent metal ions are introduced by addition of a compound containing the ions to the formulation. For example, the addition of calcium ions to the compositions of this invention may be accomplished by the addition of an additive such as wollastonite. The multivalent nature of the calcium ions in wollastonite permits them to coordinate silicon atoms in the coating in a manner not accomplished by monovalent metal ions such as the alkali metals. Magnesium ions may be introduced with similar effect using, for example, talc as an additive to the compositions of this invention. Other additions may, of course, be used as will be apparent to those skilled in the art to introduce such other multivalent ions as lead, iron, and antimony. Sources for such divalent ions are lead zirconate, lead titanate, and magnesium trisilicate.

The amount of additive material to be used with the compositions of this invention to provide a coordinating multivalent ion will depend upon both the silica content of the coating and the amount of coordination desired to be accomplished. Generally, in the case of wollastonite, up to about 15 percent by weight based upon the unbulked base vehicle may be used. The amount for other metal additives will vary depending upon the amount of metal ion present in a given weight unit of the additive material. However, it may be generally stated that up to about 10 or 15 percent by weight of an additive material may be used to introduce multivalent ions. However, it also should be noted that greater amounts of wollastonite or talc than prescribed for coordinating the silica network may be used. These compounds may also be used in larger amounts than set forth here when they function as bulking agents, or opacifiers or the like. In those cases, the coatings of this invention have not been found to demonstrate adverse effects but rather the greater the amount of metal ion available to coordinate the silica network, it appears the higher $SiO_2:M_2O$ ratio the coatings can tolerate without cracking after application.

It is pointed out that the multivalent ion contributors may be used in combination in the novel compositions of this invention. Consequently, wollastonite (which is primarily $CaSiO_3$), lead titanate and lead zirconate may all be used in combination to cross-link the silica network and promote the dehydration of the colloidal silica thus developing the silica network in the ultimate coating.

The novel compositions of this invention may also utilize secondary film formers in addition to the alkali metal silicate and the colloidal silica which are the primary film formers in the compositions herein. For example, potassium titanate may be used as a secondary film former and opacifier in the compositions herein. The addition of potassium titanate appears to lend a fibrous character to the finishes of the instant invention and consequently bind them together preventing cracking and making a tight film.

The potassium titanate may be typically employed in amounts ranging up to about 15 percent by weight based upon the constituents of the basic vehicle, i.e., the alkali metal silicate solution and the aqueous dispersion of the colloidal sol. However, it will be appreciated that the use of such ingredients may be modified and altered consistent with the specific utility for which the coating is being designed.

The coatings of this invention may be bulked with a variety of materials depending upon the ultimate use. One particular bulking agent which is preferred is finely divided mica. Typically all bulking materials are used in finely divided form, usually in a particle size less than about 325 mesh. The addition of mica to the compositions of this invention provides an extremely hard coating which has excellent bridging characteristics, and consequently can be used on porous surfaces to produce a noncracking continuous film. In particular, mica may be used as a bulking agent with the coatings of the instant invention to provide a coating material useful for fireproofing polyurethane foam. When mica is used as a bulking agent, it will generally be employed in amounts ranging up to about 20 percent by weight based upon the weight of the basic vehicle components, i.e., the alkali metal silicate solution and the aqueous dispersion of the colloidal silica sol. However, as will be appreciated the addition of the bulking agents to the compositions of the instant invention will depend heavily upon the desired consistency of the coating, the other insoluble constituents added and the like.

Various other bulking agents may be employed as will be apparent to those skilled in the art. For example, kaolinite may be employed as a bulking agent for the compositions herein. The kaolinite appears to promote film integrity and acts as a buffer in the compositions of this invention stabilizing pH. Of course, pigments and the like may be employed in the compositions of this invention and consequently such pigment materials as titanium dioxide, ferric oxide, and the like may be added as if other coatings as will be appreciated by those skilled in the art.

The coatings of the instant invention may also be modified by addition of zinc dust in a manner similar to the zinc-modified coatings disclosed in copending application Ser. No. 750,461. Because of its reactivity, the zinc may be used in large amounts so as to provide up to about 80 percent by dry weight of the ultimate dry coating. The formulation of zinc-modified coatings in accordance with the two-container systems of this invention is accomplished by maintaining the zinc dust separate from both the alkali metal silicate solution phase and the colloidal silica sol phase until their admixture. The zinc dust is sufficiently reactive that it cannot be placed in either the alkali metal silicate solution phase or the colloidal silica sol phase and enable obtaining of any sufficient shelf life of either of these phases. Thus in essence, any zinc-modified coatings in accordance with this invention would be three-container systems wherein the alkali metal silicate solution, the aqueous dispersion of the colloidal silica sol and the zinc dust would all be admixed shortly prior to use.

Other bulking agents similar to those disclosed in copending application Ser. No. 750,461 may also be employed, usually in amounts up to about 35 percent by weight of the solution-dispersion vehicle. Thus, for example, stainless steel flakes, aluminum powder and the like may be used in the compositions of this invention to impart hardness, corrosion-resistance, and the like. In addition, finely divided organic polymers such as finely divided polytetrafluoroethylene may also be employed. When such organic polymers are employed, it is preferred that the aqueous colloidal silica dispersion contain some aluminum oxide-modified silica to assist the wetting in of the polymer.

Compositions of the instant invention may also be modified by introduction of organic ingredients to increase the flexibility of the coating and prevent cracking. In this regard, the coatings of this invention can be modified by the addition of, for example, a latex emulsion or acetoxalated polyethylene emulsion. These additives are supplied in small amounts, typically about 10 to 15 percent by weight of the alkali metal silicate solution and the aqueous colloidal silica dispersion.

In preparing the compositions of the instant invention, it has been found that maximum water resistance is obtained in the ultimate coating if all the additive materials are introduced in the alkali metal silicate solution, and the aqueous dispersion of colloidal silica is maintained unmodified until the time when the solution phase and dispersion phase are admixed. However, satisfactory coatings are obtained wherein the various components are distributed between the alkali metal silicate solution and the colloidal silica dispersion prior to their admixture. It is preferred in any case to maintain at least a portion of the silane wetting agent in the alkali metal silicate solution. It has also been found that when extremely fine particulate titanium dioxide is to be incorporated in the coatings that it is preferred that the titanium dioxide be incorporated only in the alkali metal silicate solution, and that this titanium dioxide not be maintained in the aqueous colloidal dispersion phase prior to the admixture of the two phases.

The coatings of the instant invention are prepared by mixing the alkali metal silicate solution and the aqueous colloidal silica dispersion containing the various other constituents as outlined above with brisk agitation. After sufficient agitation to create apparent uniformity of the mixture, the combination is then permitted to stand for a short period of time, about an hour, in order that the mixture may reach a dispersive equilibration. After admixture, the compositions of this invention are self-curing even without significant evaporation of water and have a shelf life of between about 24 and 48 hours, and consequently must be applied shortly after the combination of the silicate solution and aqueous colloidal silica dispersion phases.

The basic vehicle of this invention including only the alkali metal silicate solution, the aqueous colloidal silica dispersion, and preferably wetting agent and some multivalent metal ion can without further bulking provide an excellent bake-dry finish. When the compositions are further bulked by addition of talc, mica, or any of the other bulking agents outlined above, suitable, smooth, and satin-to-glossy air-dry finishes are obtainable. With these self-curing air-dry compositions, a forced drying at elevated temperatures may, of course, be accomplished if this is desired. When such drying is encountered, care should be taken that the drying operation is not so rapid as to produce a cracking of the coating. Generally, it is advantageous to bake dry the compositions of the instant invention at a temperature between about 100° up to about 250° F.

The compositions of this invention may be used to coat a variety of substrates including metal, glass, plastic, wood, ceramic materials such as stone or brick, and polyurethane foam. Usually the compositions of this invention are employed to produce a film thickness between about 1 and 25 or 30 mils.

The compositions of this invention may be applied to the substrate by brushing, spraying, blading, dipping, or any other conventional technique. The method of application will at times dictate the viscosity of the coatings which may be used. The coatings herein can be altered in viscosity by varying the water content without adversely effecting the coating qualities. However, water should not be added in such amount to decrease the solids content of the basic vehicle to less than 35 percent by weight. If water is added to the compositions of this invention in significant quantity, these compositions begin to take on the character of the compositions of copending application Ser. No. 750,461. The coatings resulting therefrom will then have a flat finish and the film produced by the coating will be more porous and not as tight as those available with the compositions disclosed herein wherein the solid content of the basic vehicle is greater than 35 percent. The following Examples are illustrative.

EXAMPLE 1

To container A containing 200 grams of a potassium silicate solution with a solids content of about 35 percent and an $SiO_2:K_2$ mole ratio of 3.3:1, is added the contents of container B containing 200 grams of about a 50 percent colloidal silica sol at a pH of about 9.5 with constant agitation. The contents are mixed until the colloidal silica sol is uniformly dispersed. The combined solution-dispersion has an $SiO_2:K_2O$ mole ratio of about 10:1. This composition may be applied to a metal substrate such as steel or aluminum by dipping, spraying, or the like. The coating should then be baked at about 225° F. and will produce a substantially clear glossy coating.

A similar coating can be prepared wherein container B contains 168 grams of about a 50 percent colloidal silica sol. This will result in a solution-dispersion having an $SiO_2:K_2O$ ratio of about 8.8 to 1.

A translucent coating can be obtained with the composition of example 1 by adding small amounts of a multivalent metal ion contributor to both container A and container B. For example, if about 1 gram of wollastonite is thoroughly mixed into container A and 1 gram of wollastonite is thoroughly mixed into container B prior to the admixing of the two containers, a translucent coating will be obtained. Other compounds which could be used to supply multivalent metal ions and produce a translucent coating are lead zirconate, lead titanate, and magnesium trisilicate.

The composition of example 1 may also be modified by the addition of a silane wetting agent. For example, about 4 percent by weight of a silane wetting agent may be blended into container A and about 1 percent by weight blended into container B. Preferable silane wetting agents include the trifunctional and quadrafunctional silanes disclosed above.

EXAMPLE 2

The contents of container A are prepared by adding to 200 grams of a potassium silicate solution with a solids content of 35 percent in an $SiO_2:K_2O$ molar ratio of 3.3, 4 grams of methyl trimethoxy silane followed by 8 grams of wollastonite, 15 grams of potassium titanate, and 5 grams of mica. The contents of container B are formulated by adding to 200 grams of a 50 percent by weight colloidal silica sol having a pH of 9.5, 8 grams of wollastonite, 4 grams of hydrophobic silica (having pendent oxymethyl groups), 5 grams of potassium titanate, and 40 grams of mica.

Containers A and B are blended separately until the ingredients are thoroughly dispersed. Following dispersion of each of the mixtures, container B is slowly added to container A with constant stirring. The resultant composition is shaken and allowed to equilibrate until a fine dispersion is obtained prior to application.

The above composition has an $SiO_2:K_2O$ ratio of about 10 to 1.

A composition with a lower $SiO_2:K_2O$ ratio may be formulated by using 168 grams of the 50 percent colloidal silica sol instead of 200 grams used above. In such a formulation to obtain proper viscosity characteristics, the amount of mica added to container B would preferably be 30 grams instead of 40 grams as disclosed above.

EXAMPLE 3

The contents of container A is formulated by adding to 200 grams of a potassium silicate solution with a solids content of 35 percent and an $SiO_2:K_2O$ mole ratio of 3.3, 4 grams of phenyl trimethoxy silane, 20 grams of wollastonite, 32 grams of titanium dioxide, 20 grams of talc, and 50 grams of mica. The contents of container B are formulated by adding 8 grams of wollastonite, 4 grams of hydrophobic silica, 20 grams of titanium dioxide, and 40 grams of mica to 168 grams of a 50 percent colloidal silica sol having a pH of 9.5.

The ingredients of container A and container B are completely dispersed and hydrolyzed, after which the contents of container B is added to container A with mechanical agitation. The resulting solution dispersion has an $SiO_2:K_2O$ mole ratio of about 8.8:1 and a solids content of 41.8 percent. The solution-dispersion is permitted to stand for about 1 to 2 hours until a dispersive equilibrium has been achieved. The coating composition can then be applied to a substrate.

A coating formulated as in example 3 is applied to a new concrete block and permitted to dry. After examining the block with a magnifying glass, it was noted that perfect bridging was accomplished in the voids of the concrete block with no cracking.

A coating formulated as in example 3 was applied to cedar and let dry. After drying several hours, it was examined with a magnifying glass and there was no apparent cracking, but it was noted that a discoloring of the surface occurred. This discoloration did not effect the coating and it is postulated that the discoloration was caused by the water soluble acids in the cedar.

A coating as in example 3 was prepared and applied to cedar siding at Matagorda, Texas at a seashore site. The solution was permitted to dry for one week and later it was checked and found to have suffered no apparent adverse effect. There was a discoloration of this first coat as noted above. A second coat was applied and no discoloration of the second coat was noted. After 45 days, exposure to damp salt air, the coating had suffered no further adverse effects. A system was prepared in accordance with example 3 and was applied to yellow pine over vinyl acrylic latex semigloss coating. The adhesion appeared to be good to the latex and the sample was exposed to the weather for a period in excess of 120 days. The coating had not peeled or suffered any other adverse effects that were apparent.

The coating in accordance with example 3 were mixed and applied by hand to cedar and yellow pine. After drying, it was noted there was no apparent cracking. Both samples were subjected to the flame of a Bunsen burner with the coated side toward the flame. The coating did not burn although the samples were maintained over the burner for a sufficient period of time that the opposite side of the wood began to burn.

A coating formulation in accordance with example 3 was prepared and applied to wood as very thick film about 50 to 70 mils in thickness and permitted to dry. There was no apparent cracking. After air drying 2 weeks, the sample was exposed to oil and water for 30 minutes and no adverse effects on the coating were noted.

A coating formulation in accordance with example 3 was prepared and applied to the surface of a polyurethane foam sheet. After drying for two days, the coating was securely adhering to the foam and the foam was subjected to the flame of a propane torch. The foam was heated sufficiently so that Freon gas could be heard escaping from the foam; however, upon removal of the flame, the coating was integral and presented a smooth surface which was easily cleaned.

A formulation in accordance with example 3 was prepared and applied to all sides of a block of polyurethane foam. After drying for several days, the coated block of foam was placed in a gas flame. After 10 minutes in the gas flame, the fire was cut off. The block remained intact although it was warped from the intense heat. After breaking the coating, it was noted that the foam had melted behind the coating. However, during the subjection to the flame, the foam did not burn.

A coating in accordance with example 3 was prepared and applied to an acoustic ceiling tile made from pressed cane fiber. The tile had 3/16-inch holes on ½-inch centers and the coating was applied to the surface to bridge over the holes. After drying, the coating did not crack. It was noted the material had a pot life of 24 hours. The material began getting viscous after 24 hours. It could be used for patching larger cracks even though it was very thick, it flowed out very well after being troweled into cracks after 24 hours, it had a tendency to crack when applied in very thick films. However, the adhesion did not appear to suffer.

EXAMPLE 4

The contents of container A are prepared by adding 4 grams of methyl trimethoxy silane, 20 grams of wollastonite, 32 grams of titanium dioxide, 4 grams of hydrophobic silica, 20 grams of talc, and 58 grams of mica to 200 grams of a potassium silicate solution having a solids content of 35 percent in and $SiO_2:K_2O$ mole ratio of 3.3. The contents of container B are 168 grams of a 50 percent aqueous dispersion of a colloidal silica sol having a pH of about 9.5.

The contents of container B are added to container A with rapid agitation to obtain complete dispersion. If necessary, the resulting solution-dispersion is permitted to equilibrate for about an hour. The resulting coating has a solids content of about 41.8 percent at an $SiO_2:K_2O$ mole ratio of about 8.8:1.

The above formulations wherein silane wetting agents are employed can be modified by the addition of aluminum oxide-modified silica in small amounts, up to about 10 grams, to either container A or container B.

Other exemplary formulations follow. In each instance, only the contents of container A and container B are noted. The potassium silicate solution in each of the following is a 35 percent by weight solution having an $SiO_2:K_2O$ mole ratio of 3.3:1.

EXAMPLE 5

| Container A | |
| --- | --- |
| Potassium Silicate Solution | 380 grams |
| Titanium Dioxide | 75 grams |
| Phenyl trimethoxy silane | 9.6 grams |
| Mica | 130 grams |
| Hydrophobic silica | 5 grams |
| Wollastonite | 18 grams |

| Container B | |
| --- | --- |
| 50 Wt. % Colloidal Silica Sol (pH=9.5) | 308 grams |

The resulting solution-dispersion has an $SiO_2:K_2O$ mole ratio of about 10:1 at a solids content of about 42 percent by weight.

The resulting composition was poured over a new concrete block filling the pores and producing an air-drying film about 8 mils in thickness. No cracking was noted. This same composition can be used to coat polyurethane foam in impart fire-resistance. If desired, the titanium dioxide can be eliminated if pigmentation is not important, and additional mica may be added. By addition of more mica, an insulating potting composition can be achieved.

EXAMPLE 6

Container A

| | |
|---|---|
| Potassium silicate solution | 200 grams |
| Potassium titanate | 30 grams |

Container B

| | |
|---|---|
| 50 Wt. % Colloidal silica sol (pH=9.5) | 170 grams |
| Kaolinite | 20 grams |

This system is air drying and can be used to fireproof polyurethane foam; however, use of mica as the bulking agent is preferred for such foam applications.

EXAMPLE 7

Container A

| | |
|---|---|
| Potassium silicate solution | 200 grams |
| Titanium dioxide | 35 grams |
| Potassium titanate | 10 grams |

Container B

| | |
|---|---|
| 50 Wt. % colloidal silica sol (pH=9.5) | 208 grams |
| Acetoxylated polyethylene emulsion | 50 grams |
| Talc | 30 grams |
| Wollastonite | 40 grams |

The resulting composition has a solids content of about 42.6 percent.

EXAMPLE 8

Container A

| | |
|---|---|
| Potassium silicate solution | 200 grams |
| Potassium titanate | 20 grams |
| Titanium dioxide | 20 grams |

Container B

| | |
|---|---|
| 50 Wt. % colloidal silica sol (pH=9.5) | 170 grams |
| Potassium titanate | 10 grams |
| Lead titanate | 2 grams |
| Lead zirconate | 4 grams |
| Wollastonite | 30 grams |

EXAMPLE 9

Container A

| | |
|---|---|
| Potassium silicate solution | 200 grams |
| Titanium dioxide | 35 grams |
| Methyl trimethoxy silane | 3 grams |
| Talc | 20 grams |

Container B

| | |
|---|---|
| 50 Wt. % colloidal silica sol (pH=9.5) | 170 grams |
| Talc | 50 grams |
| Mica | 5 grams |
| Wollastonite | 40 grams |

EXAMPLE 10

Container A

| | |
|---|---|
| Potassium silicate solution | 200 grams |
| Titanium dioxide | 35 grams |

Container B

| | |
|---|---|
| 50 Wt. % colloidal silica sol (pH=9.5) | 208 grams |
| Talc | 50 grams |
| Wollastonite | 10 grams |
| Dimethyl dimethoxy silane | 4 grams |

What is claimed is:

1. A silicate coating composition comprising a solution dispersion mixture of (1) a solution phase comprising an aqueous alkali metal silicate solution having a $SiO_2:M_2O$ ratio of at least 3:1 (2) a dispersion phase comprising an aqueous colloidal silica dispersion, said mixture having a solids content of alkali metal silicate and colloidal silica more than 35 percent by weight, and said mixture having a $SiO_2:M_2O$ mole ratio of at least 8:1, and (3) from about 2 to about 15 percent by weight based upon said mixture of a water soluble silane which is a difunctional, trifunctional or quadrifunctional hydrocarbyl polyalkoxy silane selected from the group consisting of (a) dialkyl dialkoxy silanes, (b) alkyl trialkoxysilanes, (c) aryl trialkoxysilanes, (d) alkoxyalkyl trialkoxysilanes, and (e) compounds as set forth in (a) through (d) which have an oxirane oxygen on the hydrocarbyl or alkoxy portion of the silane.

2. The composition of claim 1 including a finely divided bulking agent present in amount sufficient to render said mixture air-drying.

3. The composition of claim 2 wherein said bulking agent is finely divided mica.

4. The composition of claim 1 including a multivalent metal ion contributing compound to provide calcium, magnesium, lead or antimony ions, said compound being present in an amount sufficient to coordinate silicon atoms in said coating after application.

5. The composition of claim 4 wherein said multivalent metal ion contributing compound is wollastonite.

6. The composition of claim 1 wherein up to 10 percent by weight of said colloidal silica in said dispersion phase has a surface coating of $Al_2O_3$.

7. The composition of claim 1 wherein up to 10 percent by weight of said colloidal silica is hydrophobic silica having pendent oxyalkyl groups.

8. The composition of claim 1 including zinc dust in an amount sufficient to provide up to about 90 percent by weight zinc in the dried coating of said composition.

9. A silicate coating composition comprising a coating vehicle comprising a solution-dispersion mixture consisting essentially of: a solution phase comprising an aqueous alkali metal silicate solution having an $SiO_2:M_2O$ mole ratio of between about 3–1 and 4–1; an aqueous dispersion of a colloidal silica sol; said mixture having a solids content of from 35 to 45 percent by weight and an overall $SiO_2:M_2O$ mole ratio of more than 9:1; and from 2 to 15 percent by weight based upon said mixture of a water soluble silane which is a difunctional, trifunctional or quadrifunctional hydrocarbyl polyalkoxy silane selected from the group consisting of (a) dialkyl dialkoxy silanes, (b) alkyl trialkoxysilanes, (c) aryl trialkoxysilanes, (d) alkoxyalkyl trialkoxysilanes, and (e) compounds as set forth in (a) through (d) which have an oxirane oxygen on the hydrocarbyl or alkoxy portion of the silane.

10. The composition of claim 9 including up to 35 percent by weight based upon said vehicle of a finely divided bulking agent.

11. The composition of claim 10 wherein said bulking agent comprises finely divided mica.

12. The composition of claim 9 including a multivalent metal ion contributing compound to provide calcium, magnesium, lead or antimony ions, said compound being present in an amount sufficient to coordinate silicon atoms in the coating.

13. The composition of claim 12 wherein said multivalent metal ion is contributing compound wollastonite in an amount of up to 15 percent by weight based upon said vehicle.

14. The composition of claim 9 including a pigment provided in said solution phase.

15. The composition of claim 14 wherein said pigment is titanium dioxide.

16. A composition for fireproofing polyurethane foam according to claim 10 wherein said bulking agent comprises mica.

17. The composition of claim 10 wherein said bulking agent comprises kaolinite.

18. The composition of claim 12 wherein said metal ion contributing compound is selected from the group of wollastonite, talc, lead zirconate, lead titanate, and magnesium trisilicate.

19. The composition of claim 9 including potassium titanate as a secondary film former in said coating composition.

20. The composition of claim 9 including a latex emulsion provided in an amount sufficient to prevent cracking of the coating after application.

21. A silicate coating composition comprising a coating vehicle comprising a solution-dispersion mixture consisting essentially of: a solution phase comprising an aqueous alkali metal silicate solution having an $SiO_2:M_2O$ mole ratio of between about 3–1 and 4–1; an aqueous dispersion of a colloidal silica sol; said mixture having a solids content of at least 40 percent by weight and an overall $SiO_2:M_2O$ mole ratio of about 10:1; and from 2 to 15 percent by weight based upon said mixture of a water soluble silane which is a difunctional, trifunctional or quadrifunctional hydrocarbyl polyalkoxy silane selected from the group consisting of (a) dialkyl dialkoxy silanes, (b) alkyl trialkoxysilanes, (c) aryl trialkoxysilanes, (d) alkoxyalkyl trialkoxysilanes, and (e) compounds as set forth in (a) through (d) which have an oxirane oxygen on the hydrocarbyl or alkoxy portion of the silane.

* * * * *